May 18, 1926.
M. WEISS
1,585,138
SIGNAL ARM FOR CLOSED BODY AUTOMOBILES
Filed Nov. 14, 1925
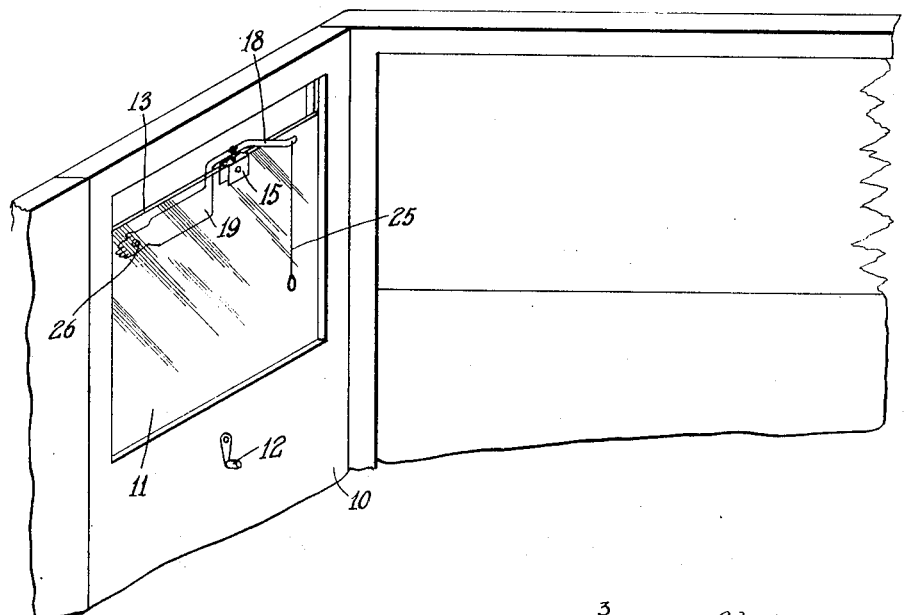
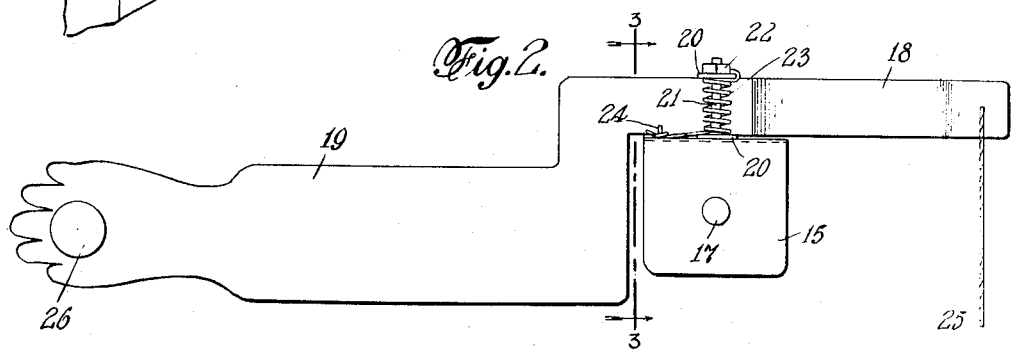
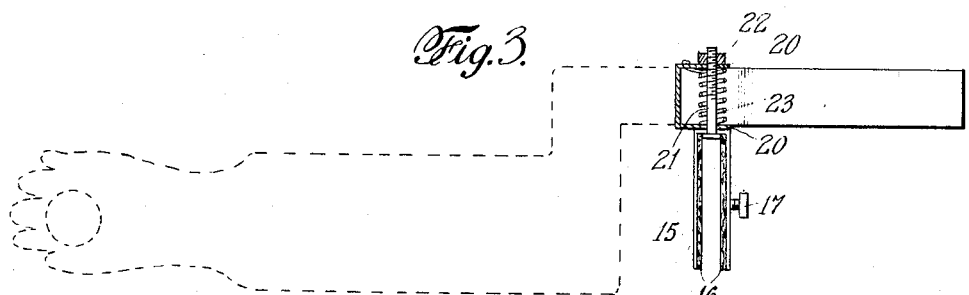
INVENTOR
Max Weiss
BY
ATTORNEY Patented May 18, 1926.

1,585,138

UNITED STATES PATENT OFFICE.

MAX WEISS, OF NEW YORK, N. Y.

SIGNAL ARM FOR CLOSED-BODY AUTOMOBILES.

Application filed November 14, 1925. Serial No. 68,986.

The invention relates to devices adapted for use with closed body automobiles, and is adapted more especially for temporary use in giving notice to the driver of an automobile following the one thus equipped. In operating this particular class of cars, it is frequently found desirable to raise, if not entirely close, the front window of the car at the left hand of the driver, especially during inclement weather as in rains, or during cold and windy days. Under these conditions, it is then not possible to signal in the usual manner by the customary practice of extending one's hand which, of course, necessitates the window remaining open.

The present invention has for its object a device which may temporarily be applied and whereby the said window may be maintained substantially closed, thus avoiding the discomfort both to driver and other occupants of the car resulting from the opening of a window as set forth. A further object of the invention resides in a device which may be quickly and conveniently installed without injury to the car and which shall withal be efficient and simple in operation and of inexpensive and substantial construction.

The nature of the invention, however, will best be understood when described in connection with the accompanying drawings in which—

Fig. 1 is a fragmentary perspective view of a portion of a closed body car and illustrates the novel device installed ready for use.

Fig. 2 is a detail front elevation of the signal device; and Fig. 3 is a transverse section thereof taken on the line 3—3, Fig. 2, and looking in the direction of the arrows.

Referring to the drawings 10 designates a portion of a closed automobile body including the left hand front corner post or frame member, the windshield and the left front movable window 11 which latter is designed to be raised and lowered in its frame in well-known manner, as by turning a handle 12. The novel device is adapted to be applied over the upper edge 13 of the movable window 11 as is shown more particularly in Fig. 1, the installation being intended for temporary use only and so long as it is desirable to maintain said window 11 substantially closed, as indicated. It will be appreciated, however, that the device admits of a still greater degree of closure of the window than that shown.

To secure the novel indicator in position over the edge of the window 11, I make use of a bracket member, for example as of a U-shaped spring piece 15, designed to straddle the said window; and if desired, the same may be lined with felt 16 or other suitable material to afford a friction hold thereon and to prevent rattling. Furthermore, a clamping screw 17 may be arranged to pass thru the inner wall of the bracket member to still further insure its retention in place over the window 11.

The bracket, also, carries at its top a lever having an inner operating arm portion 18 and an outer indicating arm portion 19. For example, the same may be pivotally connected to the bracket thru two perforated and laterally extending integral ears 20 thru which passes a vertical shaft or bolt 21 extending also thru the top of the bracket member 15 and secured thereto by means of a nut 22 working over its outer end. A coil spring 23 surrounds said bolt between the ears 20, and one end thereof presses against the arm 18 while the other end is secured to the bracket thru an upstanding spur 24 to which it is attached. The action of the spring 23 is to normally swing the arm 19, which is directed over the outer face of the glass window 11, toward said face while the other and operating arm 18 extends within the car and affords a means for moving the lever. This may be accomplished by direct manual control thereof; but it is preferred to attach a cord member 25 thereto which, in turn, is to be drawn toward the driver when it is desired to swing outwardly the arm 19 to afford the desired signal, for example, as indicated in the position shown in dotted lines, Fig. 3 of the drawings. As soon however, as arm 18 is released, the arm 19 will be swung inwardly under the influence of said spring toward the window 11 until stopped by the same; and it is preferred to secure a pad or like member 26 upon the inner surface of said arm for effecting noiseless contact therewith as the said arm is returned to normal position. For night service, if necessary, the inner face of the arm 19 might be coated with a suitable luminescent substance or equipped with other well-known expedients.

I claim:—

1. In an antomobile of the closed body type: the combination with the driver's window; of a readily movable bracket adapted to be temporarily held over the upper edge of said window; and a lever pivoted to said bracket, having an actuating arm portion extending inwardly into the interior of the car and a spring pressed signal arm portion normally urged against the outer face of the window and adapted to be swung at right angles thereto when the actuating arm portion of the lever is correspondingly moved.

2. In an automobile of the closed body type: the combination with the driver's window; of a readily movable U-shaped bracket adapted to straddle over and snugly fit the upper edge of said window; and a lever pivoted to the top of said bracket, having an actuating arm portion extending inwardly into the interior of the car and a spring pressed signal arm portion normally urged against the outer face of the window and adapted to be swung at right angles thereto when the actuating arm portion of the lever is correspondingly moved.

3. In an automobile of the closed body type: the combination with the driver's window; of a U-shaped bracket adapted to straddle over the upper edge of said window; a lever having integral and perforated lugs extending at right angles thereto from opposite edges and over the top of said bracket, said lever having an actuating arm portion extending inwardly into the interior of the car and a signal arm portion normally urged against the outer face of the window and adapted to be swung at right angles thereto when the actuating arm portion of the lever is correspondingly moved; and a bolt member passing thru the top of the bracket and the said lugs for securing the lever to the bracket in pivotal relationship, and a spring mounted about said bolt between the said lugs, one end being secured to the U-shaped bracket and the other bearing against the lever to urge the same normally against the outer face of the window.

In testimony whereof I affix my signature.

MAX WEISS.